(12) United States Patent
Someya

(10) Patent No.: US 6,384,563 B1
(45) Date of Patent: May 7, 2002

(54) METHOD AND APPARATUS FOR LOAD TORQUE DETECTION AND DRIVE CURRENT OPTIMIZATION

(75) Inventor: Masayuki Someya, Braintree, MA (US)

(73) Assignee: Seiberco Incorporated, Braintree, MA (US)

( * ) Notice: Subject to any disclaimer, the term of this patent is extended or adjusted under 35 U.S.C. 154(b) by 0 days.

(21) Appl. No.: 09/694,467

(22) Filed: Oct. 23, 2000

(51) Int. Cl.[7] .................................. H02P 1/46
(52) U.S. Cl. .................... 318/700; 318/432; 318/438; 318/460; 318/254; 318/138; 318/439; 318/567; 318/569
(58) Field of Search ................. 318/700, 432, 318/448, 460, 254, 439, 138, 610, 567, 569

(56) References Cited

U.S. PATENT DOCUMENTS 5,610,483 A * 3/1997 Obara et al. ............... 318/139
5,625,264 A * 4/1997 Yoon .......................... 318/254

* cited by examiner

*Primary Examiner*—Karen Masih
(74) *Attorney, Agent, or Firm*—Ira S. Dorman

(57) ABSTRACT

The load torque applied to the shaft of a synchronous motor is estimated based upon a correlation established between load torque and a calculated integral of a drive current value, utilizing the measured current that is applied to drive the motor. The estimated load torque is used as the basis for controlling the driving current amplitude so as to achieve increased efficiency of energy utilization. Control apparatus embodies the technique, and a synchronous motor system includes such apparatus.

13 Claims, 2 Drawing Sheets

METHOD AND APPARATUS FOR LOAD TORQUE DETECTION AND DRIVE CURRENT OPTIMIZATION

BACKGROUND OF THE INVENTION

Conventional servo motor systems usually employ position detectors to enable the provision of the most effective position commands for driving the motor, and thereby to maximize operating efficiencies. The incorporation of such a device adds substantially to the cost and complexity of the motor system, however, and also increases the difficulty of utilizing it most effectively.

Stepping motor systems inherently afford high positioning performance and other beneficial attributes; because no position detection device is needed, moreover, they of course avoid the attendant disadvantages. On the other hand, practical operation of such motors requires the application of excessive drive currents so as to ensure that synchronism is maintained. Thus, and despite load changes, the current supplied must be set for the maximum that would normally be employed during acceleration; typically, the current utilized to drive a stepping motor is at least double that which is actually demanded by the load. Substantial amounts of energy are wasted (as excessive heat) as a result, thereby rendering such systems relatively inefficient in respect of power consumption.

An effective method and apparatus for detecting load torque in a stepping motor system, and for utilizing the same to optimize the current supplied for driving the motor, is described and claimed in Someya application Ser. No. 09/250,477, issued as U.S. Pat. No. 6,254,990 and of common assignment herewith. The technique described is directed however to systems in which pulse width modulated control of the drive current is employed, whereas many synchronous motors are operated under microstep control utilizing sinusoidal or similar current waveforms for energization of the phase windings.

SUMMARY OF THE INVENTION

Accordingly, the broad objects of the present invention are to provide a novel load torque estimating technique, a novel stepping or other synchronous motor system embodying the same, and a novel method and apparatus for controlling operation of such a motor, wherein and whereby drive current supplied to the motor can be optimized so as to improve energy utilization efficiency, without need for a position detector or similar means.

More specific objects of the invention are to provide such a system, apparatus, and method wherein and whereby the load torque upon the motor can be estimated and utilized to optimize (normally, by selective reduction) the current supplied for driving the motor.

Additional specific objects of the invention are to provide such a system, apparatus, and method wherein and whereby motor operation is relatively facile, and vibration, temperature rise, noise, complexity and cost are relatively low.

It has now been found that certain of the foregoing and related objects of the invention are attained by the provision of a method for estimating the load torque applied to the shaft of an operating synchronous motor, comprising the steps:
(a) establishing a current/torque relationship in which the integral of a drive current value, incorporating a current applied to drive the motor at a selected speed, varies as a function of the load torque on the shaft of the motor;
(b) driving the motor at the selected speed;
(c) measuring a current applied to drive the motor;
(d) calculating the integral of a drive current value that incorporates the measured current; and
(e) correlating the calculated integral to load torque, utilizing the established current/torque relationship, to thereby estimate the actual load torque applied to the shaft of the driven motor.

In carrying out the present method the measured drive current utilized will normally be a lead current (inclusive, of course, of phase currents). The current/torque relationship utilized will desirably be established by preliminary steps that include: (i) operating the motor at the selected speed under a plurality of torque load conditions; (ii) measuring the currents applied for driving the motor under each of the load conditions; and (iii) calculating integrals of drive current values incorporating the currents measured in step (ii).

Preferably, the drive current value of which the integral is calculated will also incorporate a linearizing reference signal, synchronized to the current applied to drive the motor and advantageously of square wave form, which reference signal causes the integral of the drive current value to vary as a substantially linear function of the load torque on the shaft of the motor. In such embodiments the procedure used to establish the current/torque relationship may desirably include preliminary steps in which the drive current values are calculated using an assumed value for the reference signal, the assumed value being varied as necessary to cause the integral calculated to vary as a substantially linear function of the load conditions and thereby to define the characteristics of the linearizing reference signal. In using such a procedure, the torque load conditions under which the drive currents employed in calculating the integral are measured will advantageously constitute only the no-load and the full-load (i.e., the load just below than that at which synchronism is lost) conditions, measurements under intermediate load conditions being unnecessary.

Other objects of the invention are attained by the provision of a method for driving a synchronous motor, comprising the steps:
I. establishing, as a target load factor, an optimal load torque that is to be produced by the motor operating at a selected speed, normally characterized as a proportion or percentage of the full-load torque of which the motor is capable at that speed;
II. establishing a current/torque relationship in which the integral of a drive current value, incorporating a current applied to drive the motor at the selected speed, varies as a function of the load torque on the shaft of the motor;
III. driving the motor at the selected speed; and
IV. iteratively, and in synchronism with the operating cycle of the motor, carrying out the following sequence of steps:
(a) measuring a current applied to drive the motor;
(b) calculating the integral of a drive current value that incorporates the measured current;
(c) correlating the calculated integral to the load torque, utilizing the established current/torque relationship, and thereby estimating the actual load torque applied to the shaft of the operating motor;
(d) calculating an estimated load ratio, normally constituting the ratio of the estimated actual load torque to the full-load torque for the motor operating at the selected speed;
(e) comparing the estimated load ratio to the target load factor; and (f) adjusting the amplitude of the current applied to drive the motor as necessary to cause the estimated load ratio to approach the target load factor.

In implementing the foregoing motor-driving method, the estimated load ratio will desirably be calculated in accordance with the expression:

ELR=(N−M)/(N−F)

wherein ELR is the estimated load ratio, N is a calculated integral of the drive current value that incorporates a measured current applied to drive the motor under the no-load conditions, M is the integral calculated in step (b) above, and F is a calculated integral of the drive current value that incorporates a measured current applied to drive the motor under the full-load condition. (Needless to say, the product is multiplied by 100 if the ELR is to be expressed as a percentage value.)

Additional objects of the invention are attained by the provision of apparatus for controlling operation of a synchronous motor, comprising:

(a) means for storing electronically data defining the current/torque relationship described herein;

(b) means for measuring a current applied to drive the motor at a selected speed;

(c) means for calculating the integral of a drive current value that incorporates the measured current; and (d) means for correlating load torque to the calculated integral, utilizing the stored current/torque relationship data, thereby to estimate the actual load torque applied to the shaft of a driven motor. Such control apparatus may further comprise:

(e) means for storing electronically the described target load factor; and (f) means for carrying out, on a cyclical basis timed to the operating cycle of the motor, each of the steps:

(i) measuring a current applied to drive the motor;

(ii) calculating the integral of a drive current value that incorporates the current measured in step (i);

(iii) correlating the integral calculated in step (ii) to load torque, utilizing the stored current/torque relationship data, and thereby estimating the actual load torque applied to the shaft of the motor;

(iv) calculating an estimated load ratio, constituting the ratio of actual load torque estimated in (iii) to the full-load torque for the motor operating at a selected speed;

(v) comparing the estimated load ratio calculated in step (iv) to the stored target load factor; and (vi) adjusting the amplitude of the current applied to drive the motor, as necessary to cause the calculated estimated load to approach the target load factor.

Yet additional objects are attained by the provision of a motor system comprised of a synchronous motor, control apparatus as described herein, and means operatively connecting the motor and the control apparatus to enable the control apparatus to control operation of the motor.

DETAILED DESCRIPTION OF THE PREFERRED AND ILLUSTRATED EMBODIMENTS

Figure 1:
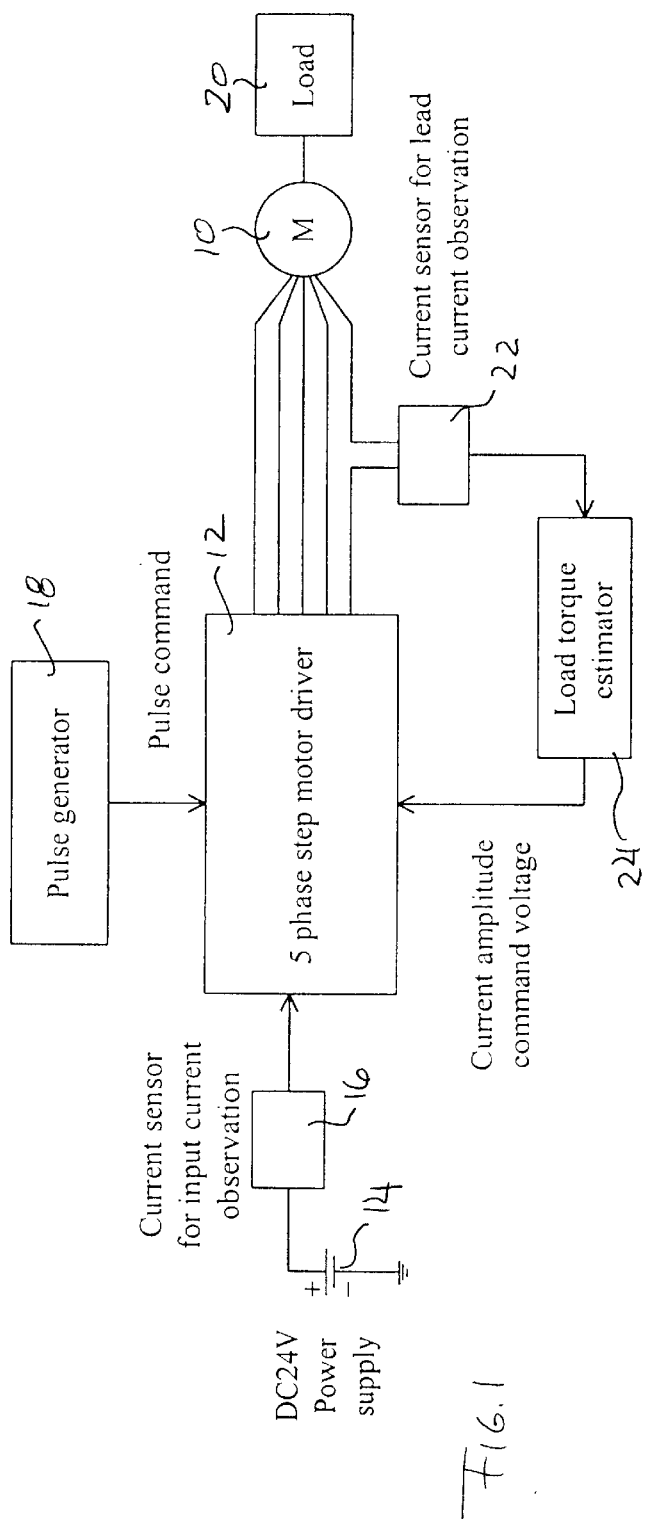
FIG. 1 is a schematic diagram of a five-phase stepping motor system embodying the present invention.

Turning initially in greater detail to FIG. 1 of the drawings, therein illustrated is a stepping motor system embodying the present invention and including a motor 10, which is, solely for purposes of the discussion that follows, taken to be a five-phase stepper motor having a ring-shape pentagonal wiring configuration. The motor driver 12 is connected to a direct current power supply 14 (typically of 24 volts) through a current sensor 16, utilized for observation of input current. A pulse generator 18 provides pulse commands to the motor driver 12, and the load on the shaft of the motor 10 may be applied by means of a power brake, diagrammatically illustrated at 20. A current sensor 22, for lead current observation, is connected to one of the leads from the driver 12 to the motor 10, and a load torque estimator 24 (comprised of suitable electronic data processing means) receives a signal from the current sensor 22 and delivers a current amplitude command signal to the driver 12. With the exception of the load torque estimator 24, the components of the system depicted in FIG. 1 are conventional and may take any suitable form, as will be evident to those skilled in the art.

Figure 2B:
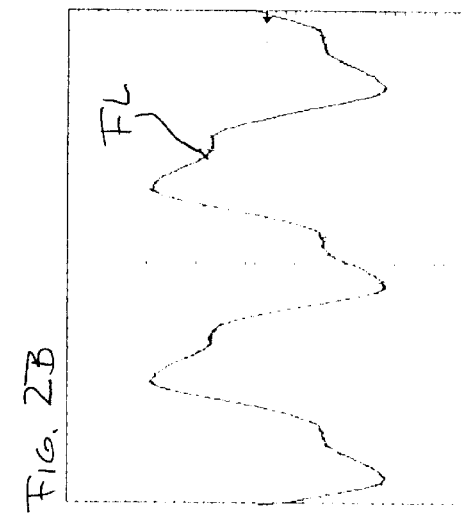
FIGS. 2A and 2B are curves representing wave-forms of a lead current applied for driving the motor, in a system such as that of FIG. 1, at a selected speed and under no-load and full rated load conditions, respectively.
Figure 2A:
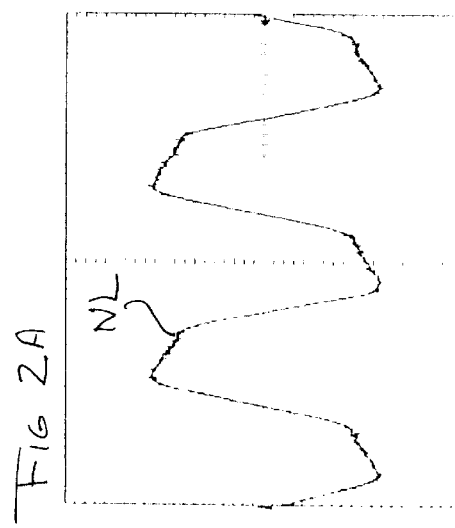

The wave-forms depicted in FIGS. 2A and 2B are typical of those produced by lead currents utilized for driving a motor of the kind employed in the system of FIG. 1. The wave-form of FIG. 2A results from driving the motor at one revolution per second under no-load (NL) conditions and with an input current of one ampere; FIG. 2B depicts the current supplied for operating the motor under the same conditions but with full rated load torque (FL) applied.

Figure 3:
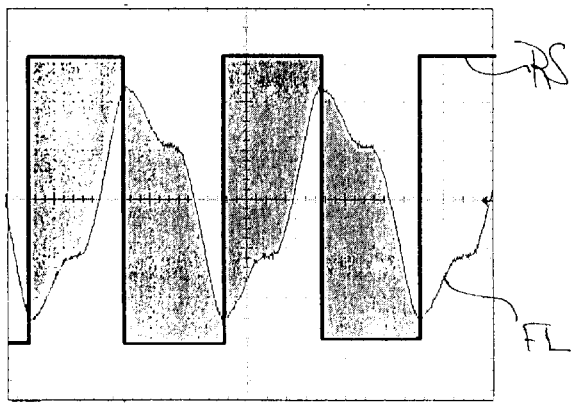
FIG. 3 is a diagram showing a wave-form curve representing the lead current applied for driving the motor of FIG. 1, upon which is superimposed a linearizing square wave reference signal.

In FIG. 3, a square wave-form reference signal (RS) is superimposed upon the FL wave-form of FIG. 2B. The reference signal facilitates calculation of the integral of a value that incorporates the drive current measured as described above, the integrated value constituting the shaded areas lying between the FL and the RS curves (i.e., the areas surrounded by the FL and RS lines). The reference signal is so selected as to produce a substantially linear correlation of the integrated value of the lead current to the load torque applied to the motor shaft. A suitable reference signal can usually be determined readily by empirical means; i.e., by observing the changes that occur in the integration values as the load torque on the motor is varied, with a given RS applied.

Figure 4:
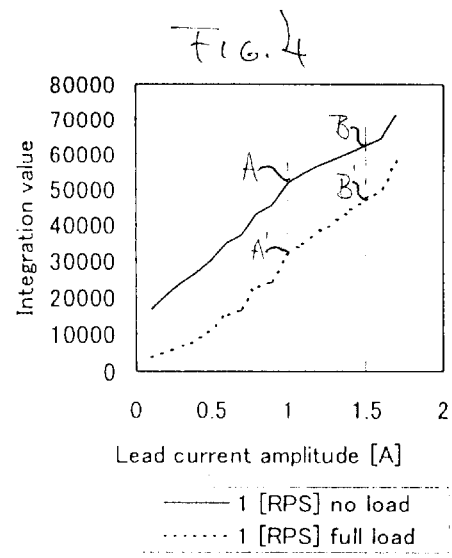
FIG. 4 is a diagram of data by which lead current amplitudes, measured under no-load and full-load conditions, are correlated to load torques, in accordance with the present invention.
Figure 5A:
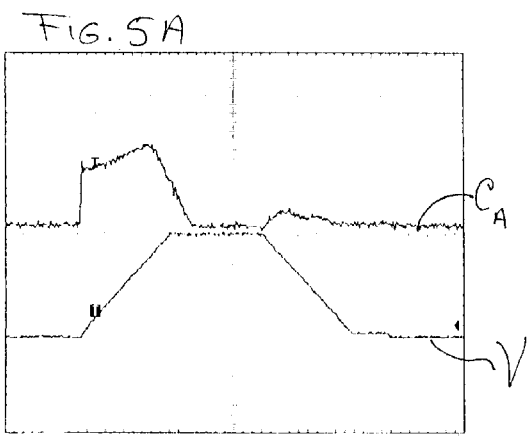
FIGS. 5A through 5D are diagrams showing the relationship between velocity and input current to the motor of FIG. 1, both with (i.e., diagrams A and B) and also without (i.e., diagrams C and D, generated with a conventional constant-current control drive) application of the control technique of the invention.
Figure 5B:
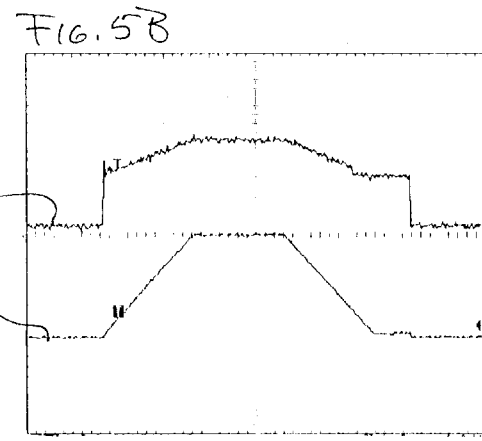
Figure 5C:
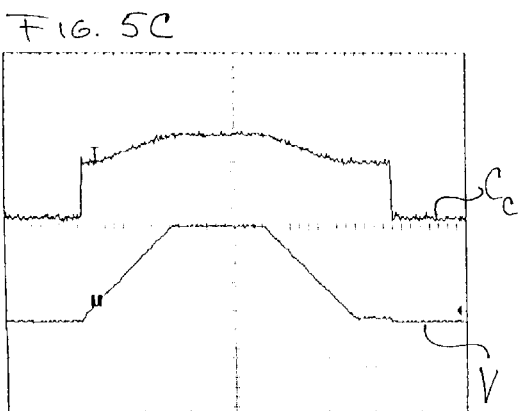
Figure 5D:
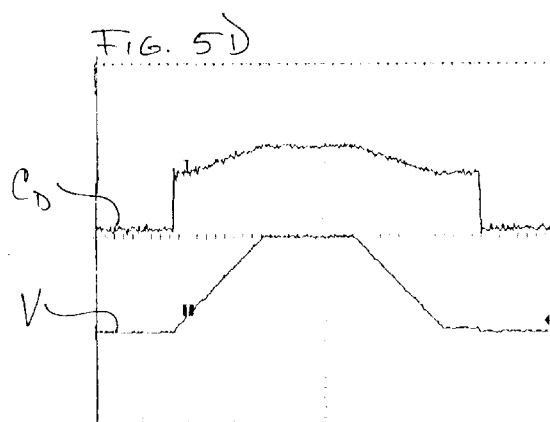

Relationships between lead current amplitudes and integrated current values are illustrated by the two curves constituting FIG. 4 of the drawings. More particularly, the upper, solid-line curve correlates calculated integration values to the lead current amplitude of a motor under no-load conditions, whereas the lower, dotted-line curve correlates integration values with the motor operating under its full rated load torque.

From FIG. 4 it can be seen that the motor, running under no-load conditions at a current amplitude of 1.0 ampere per phase, has a lead current integration value of about 52,000 (point A), whereas under full-load conditions the integration value is 31,000 (point A'). If therefore the measured integration value of the running motor were, for example, 40,000, the correlation as determined by application of the formula set forth above; i.e., ELR=(52,000−40,000)/(52,000−31,000)=0.5714, or, expressed as a percentage, 57.14%.

The system of the invention will automatically increase or decrease applied current amplitude so as to cause the calculated estimated load ratio to approach the target value. If for instance the target value is 50% of the full rated load of the motor operating at the selected speed, the current amplitude, in the example given above, would be increased so as to thereby decrease the estimated load ratio. Needless to say, by periodically estimating the load torque (typically, once during each cycle or half-cycle) the current amplitude can constantly be adjusted so as to ultimately achieve (or at least very closely approach) the target load ratio.

By way of further illustration, at a current amplitude of 1.5 amperes per phase the no-load integration value reflected by the chart of FIG. 4 would be about 61,000 (point B) and the full rated load value would be about 46,000 (point B'). Assuming the estimated load torque based upon the measured lead current were calculated to be 55,000, the motor would then be running at about 24% of the rated load torque. In this instance, therefore, the current amplitude would be decreased so as to again cause the estimated load ratio to approach a 50% target value.

FIG. 5 illustrates the savings of energy that is achieved by use of the method of the invention (diagrams A and B), as compared to using a conventional constant current control drive (diagrams C and D). The motors are run so that the velocity profiles V are virtually the same in all cases. While, under full-load, the required input current is quite independent of whether the novel control of the instant method ($C_B$) or the conventional control ($C_D$) is employed, the curve $C_A$ shows a dramatic reduction in the energy required to produce the profile V under no-load conditions, as compared to curve $C_C$. Comparable energy efficiencies are of course realized in motors running with loads intermediate the minimum and maximum values.

It will be appreciated that the current integration value/load torque correlation will normally constitute a library of data stored in the memory of a computer comprising the motor system, which computer will of course also store target load factors and will effect the comparisons and calculations described herein. It will also be appreciated that a set of data will usually be provided for each lead current amplitude and each speed at which the motor is to operate (or for each of number of selected ranges of current amplitudes and motor speeds), and that the correlation values may vary widely depending upon the particular nature and characteristics of any given motor.

Figure 6:
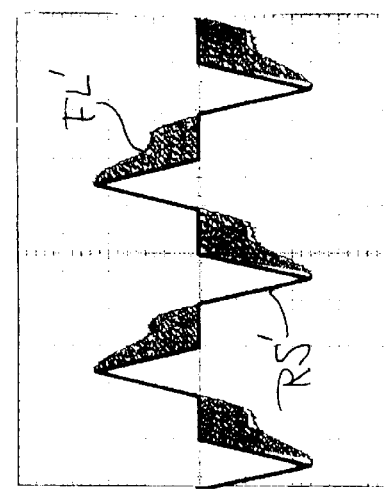
FIG. 6 is a diagram similar to that of FIG. 3, wherein the superimposed reference signal is of generally triangular, compound shape.

Albeit not essential in all instances, the imposition of a synchronized linearizing reference signal upon the current waveform is highly desirable, as greatly simplifying the creation and use of data bases for correlating integrated current values to load torque. Although the characteristics of an effective linearizing reference signal are readily determined by the empirical method described above, other means for doing so may readily occur to those skilled in the art. It will be appreciated that reference signals of a wide variety of forms other than square-wave will be suitable for certain motors, depending upon winding configuration, drive parameters, etc. For example, a second form of reference signal RS', which also produces good linearity for load torque estimation, is depicted in FIG. 6, superimposed upon a full load wave-form FL'; the shaded, surrounded areas again represent the integration value.

Thus, it can be seen that the present invention provides a novel load torque estimating technique, a novel motor system embodying the same, and a novel method and apparatus for controlling operation of such a motor, wherein and whereby drive current supplied to the motor can be optimized so as to improve energy utilization efficiency without the need for a position detector or similar means. The estimated load torque can be utilized to optimize (normally, by selective reduction) the current supplied for driving the motor, and the system, apparatus, and method of the invention render motor operation relatively facile while also reducing vibration, temperature rise, noise, complexity and costs. The technique is neither limited to nor exclusive of systems in which pulse width modulated control of the drive current is employed, and is applicable as long as the motor exhibits EMF characteristics.

Having thus described the invention, what is claimed is:

1. A method for estimating the load torque applied to the shaft of an operating synchronous motor, comprising the steps:

(a) establishing a current/torque relationship in which the integral of a drive current value, incorporating a current applied to drive said motor at a selected speed, varies as a function of the load torque on the shaft of said motor;

(b) driving said motor at said selected speed;

(c) measuring a current applied to drive said motor in step (b);

(d) calculating the integral of a drive current value that incorporates said current measured in step (c); and (e) correlating said integral calculated in step (d) to load torque, utilizing said established current/torque relationship, and thereby estimating the actual load torque applied to the shaft of said driven motor.

2. The method of claim 1 wherein said current applied to drive said motor is a lead current.

3. The method of claim 2 wherein said current applied is a motor phase current.

4. The method of claim 1 wherein said current/torque relationship is established by preliminary steps including: (i) operating said motor at said selected speed under a plurality of torque load conditions; (ii) measuring the currents applied for driving said motor under each of said load conditions of step (i); and (iii) calculating integrals of such drive current values incorporating said currents measured in step (ii).

5. The method of claim 1 wherein said drive current value incorporates a linearizing reference signal; synchronized to said current applied to drive said motor, which reference signal causes said integral of said drive current value to vary as a substantially linear function of the load torque on the shaft of said motor.

6. The method of claim 5 wherein said linearizing reference signal is of square wave form.

7. The method of claim 5 wherein said current/torque relationship is established by preliminary steps including: (i) operating said motor at said selected speed under a plurality of torque load conditions, (ii) measuring the current applied for driving said motor under each of said load conditions of step (i); (iii) calculating integrals of such drive current values incorporating said currents measured in step (ii), using an assumed value for said reference signal; and (iv) varying said assumed reference signal value as necessary to cause said integrals calculated in step (iii) to vary as a substantially linear function of said load conditions, thereby to define the characteristics of said linearizing reference signal.

8. The method of claim 7 wherein said torque load conditions include no-load and full-load conditions.

9. In a method for driving a synchronous motor, the steps comprising:

I. establishing, as a target load factor, an optimal load torque that is to be produced by said motor operating at a selected speed, characterized as a proportion of the full-load torque of which said motor is capable at said speed;

II. establishing a current/torque relationship in which the integral of a drive current value, incorporating a current applied to drive said motor at said selected speed, varies as a function of the load torque on the shaft of said motor;

III. driving said motor at said selected speed; and

IV. iteratively, and in synchronism with the operating cycle of said motor, carrying out the following sequence of steps:
    (a) measuring a current applied to drive said motor in said step III.;
    (b) calculating the integral of a drive current value that incorporates said current measured in step (a);
    (c) correlating, to load torque, said integral calculated in step (b), utilizing said established current/torque relationship of step II., and thereby estimating the actual load torque applied to the shaft of said operating motor;
    (d) calculating an estimated load ratio, constituting the ratio of said actual load torque estimated in step (c) to the full-load torque for said motor operating at said selected speed;
    (e) comparing said estimated load ratio to said target load factor; and
    (f) adjusting the amplitude of said current applied to drive said motor as necessary to cause said estimated load ratio to approach said target load factor.

10. The method of claim 9 wherein said estimated load ratio is calculated in accordance with the expression:

$$ELR=(N-M)/(N-F)$$

wherein ELR is said estimated load ratio, N is a calculated integral of the drive current value that incorporates a measured current applied to drive said motor under the no-load condition, M is the integral calculated in said calculating step (b), and F is a calculated integral of the drive current value that incorporates a measured current applied to drive the motor under the full-load condition.

11. Apparatus for controlling operation of a synchronous motor, comprising:

(a) means for storing electronically data defining a current/torque relationship in which the integral of a drive current value, incorporating a current applied to drive a synchronous motor at a selected speed, varies as a function of the load torque on the shaft of the motor;

(b) means for measuring a current applied to drive the motor at a selected speed;

(c) means for calculating the integral of a drive current value that incorporates the current measured by said means for measuring; and (d) means for correlating load torque to the integral calculated by said means for calculating, utilizing said current/torque relationship data stored by said means for storing, thereby to estimate the actual load torque applied to the shaft of a driven motor.

12. The apparatus of claim 11 further comprising: (e) means for storing electronically a target load factor constituting an optimal load torque that is to be produced by the motor, characterized as a proportion of the full-load torque of which the motor is capable at a selected speed; and (f) means for carrying out, on a cyclical basis timed to the operating cycle of the motor, each of the steps:

(i) measuring a current applied to drive the motor;

(ii) calculating the integral of a drive current value that incorporates the current measured in step (i);

(iii) correlating the integral calculated in step (ii) to load torque, utilizing said stored current/torque relationship data, and thereby estimating the actual load torque applied to the shaft of the motor;

(iv) calculating an estimated load ratio, constituting the ratio of actual load torque estimated in step (iii) to the full-load torque for the motor operating at a selected speed;

(v) comparing the estimated load ratio calculated in step (iv) to said stored target load factor; and (vi) adjusting the amplitude of the current applied to drive the motor, as necessary to cause the calculated estimated load to approach said target load factor.

13. A motor system comprising a synchronous motor, the control apparatus of claim 11, and means operatively connecting said motor and said control apparatus to enable said control apparatus to control operation of said motor.

\* \* \* \* \*